Jan. 15, 1957 H. E. SLOAN 2,777,704
PRECISION CHUCK JAWS
Filed June 17, 1954 3 Sheets-Sheet 1

INVENTOR
Harry E. Sloan
BY Steward & Spruegel
Attorneys.

Jan. 15, 1957   H. E. SLOAN   2,777,704
PRECISION CHUCK JAWS
Filed June 17, 1954   3 Sheets-Sheet 2
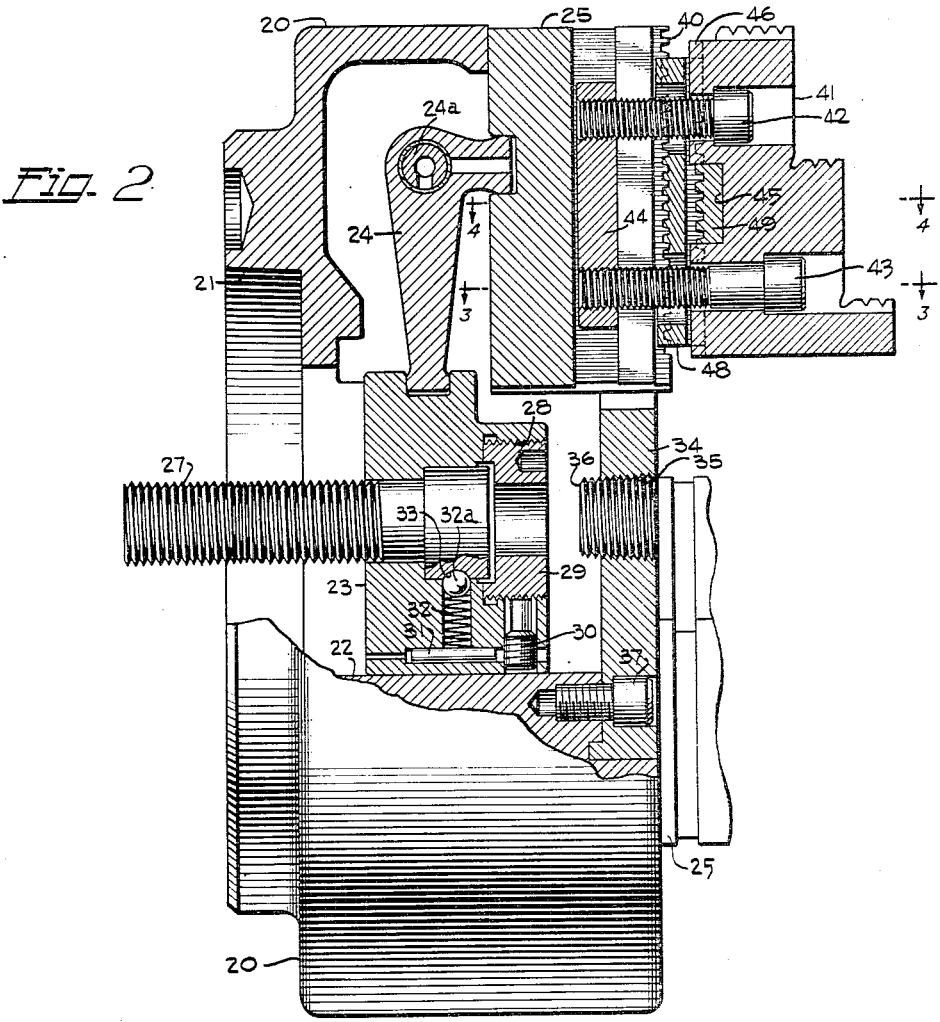
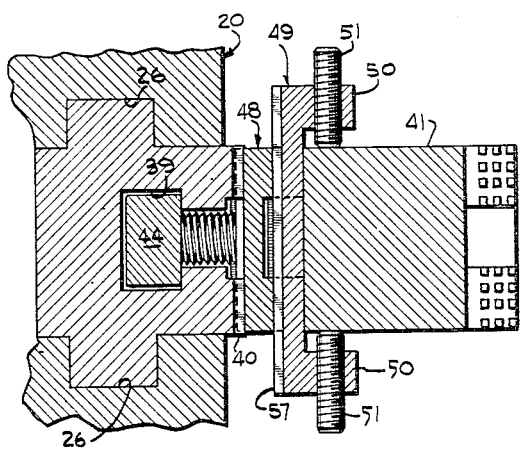
INVENTOR.
Harry E. Sloan
BY Steward + Sprugel
Attorneys.

Jan. 15, 1957 — H. E. SLOAN — 2,777,704
PRECISION CHUCK JAWS
Filed June 17, 1954 — 3 Sheets-Sheet 3

INVENTOR.
Harry E. Sloan
BY Steward + Spruegel
Attorneys.

United States Patent Office 2,777,704
Patented Jan. 15, 1957

2,777,704

PRECISION CHUCK JAWS

Harry E. Sloan, Hartford, Conn., assignor to The Cushman Chuck Company, Hartford, Conn., a corporation of Connecticut Application June 17, 1954, Serial No. 437,371

10 Claims. (Cl. 279—123)

This invention relates to precision chuck means, and more particularly to adapter means for modifying a standard serrated jaw chuck to permit independent, precision adjustment of the individual jaws thereof.

Th invention here is an improvement upon a related type of chuck disclosed in the patent to Harry I, Schuster, 2,401,971, dated June 11, 1946.

As in the case of the chuck described in the aforesaid Schuster patent, this invention has especial application to power chucks, that is, chucks of the type in which two or more jaws are simultaneously moved in a radial direction to and from work-engaging position by pneumatic, electric or hydraulic power means. In such chucks, since they are normally used for large volume production work where a particular machining operation is repetitively performed on successive work pieces, it is essential to provide a precise adjustment of the individual work-engaging jaw elements of the chuck to insure fast and accurate gripping of the work piece and proper centering thereof in the lathe or other machine tool. The present invention affords an effective means of accomplishing the foregoing in a manner which has certain very desirable advantages over generally similar means heretofore employed for this purpose.

It is a primary object of this invention to enable an operator or set-up man to accomplish the precision adjustment of a top jaw of a chuck with respect to its associated master jaw where one of such jaws is provided with teeth or serrations normally permitting only a coarse step-by-step adjustment between the two. The American Standard serrated type chuck is a well-known example of such a chuck. That is, the invention here relates to means for enabling precision adjustment to be made intermediate the coarse step-by-step adjustment normally afforded in such chucks. Chucks or chuck means for accomplishing this purpose have been proposed heretofore. These have been subject, however, to several disadvantages. For example, it has been necessary in the case of a chuck such as that disclosed in the aforesaid Schuster patent to provide a special type of master jaw employing a rack on the front face of the master jaw in which the teeth form obliquely inclined serrations with respect to the radius of the chuck. In other cases, where a chuck adapter unit has been used to obtain the desired precision adjustment intermediate the coarse step-by-step positions normally afforded, it has been necessary to machine a deeper keyway into the top jaw of the chuck than is conventionally supplied in such jaws, in order to accommodate the adapter unit. That machining operation entails first drawing the temper of the jaw by annealing, milling the keyway to the greater depth required and finally re-tempering the jaw to restore it to working hardness. Many times the shop in which the chuck is being used does not have facilities for doing this type of work, and it becomes necessary to send the chuck out or back to the factory for modification.

The present invention overcomes these disadvantages and permits the chuck of standard design, such as the American Standard serrated type mentioned above, to be quickly modified to permit the fine, independent adjustment of individual top jaws simply by inserting between the standard master and top jaws the novel adapter-set or unit here described. This may be done without any change in the existing chuck components so that they may be later used in their original condition whenever desired.

It is a still further object of the invention to provide an adapter-set for accomplishing the foregoing purposes which is simple in construction and economical to make, and yet retains the accuracy which is absolutely essential in these chucks.

With the adapter unit here disclosed, existing chucks of standard manufacture can be used with work holders made in the tool room or elsewhere, which holders can then be rapidly conformed to the required tolerance without the need of first setting up the machine to bore or grind them to the required diameter. Obviously this greatly reduces the amount of "down-time" between production runs. At the same time, a chuck which has been modified in the foregoing manner can be rapidly and simply re-converted to its original condition in all respects, so that the added expense of special purpose chucks is substantially reduced.

Other objects and advantages of the adapter-set or conversion unit here disclosed will become obvious from the following description of a particular form of adapter embodying the invention illustrated in the following drawings in which Fig. 1 is a front elevational view of a three-jaw chuck, a master jaw alone being shown in one position, a master jaw and novel adapter-set being shown in a second position, and in the third position a complete jaw assembly including an adapter-set and top jaw;

Fig. 2 is a side elevational view of a chuck such as that shown in Fig. 1, partly in section and partly broken away to simplify the illustration;

Fig. 4 is a similar view taken on line 4—4 of Fig. 2;

Figure 1:
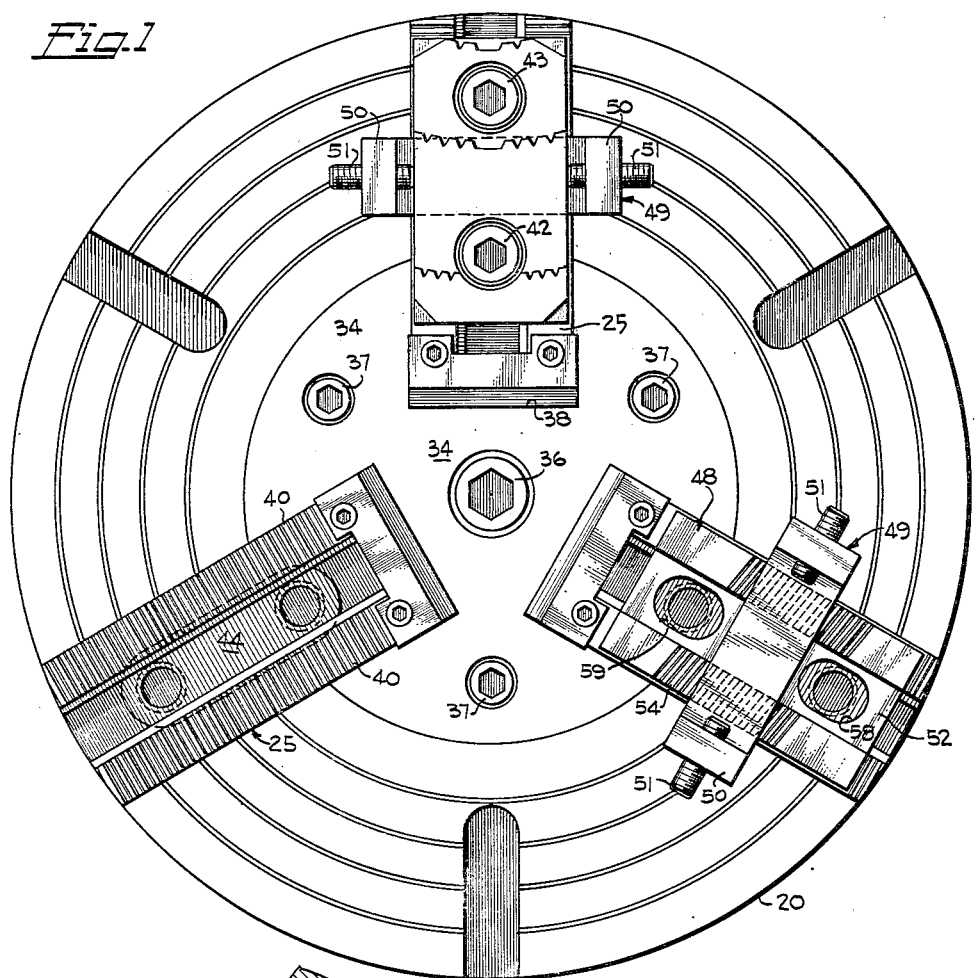

The chuck body and the operating components thereof for effecting simultaneous gripping action by the three chuck jaws, illustrated in Figs. 1 and 2 of the drawings, are of standard manufacture and for this reason will be described as briefly as possible, their construction and operation being well understood by those skilled in the art. The chuck itself here comprises a body 20 formed of a one-piece steel casting and provided in its rear face with a tapered recess 21 within which the spindle (not shown) of the lathe is adapted to fit in order to mount the chuck. The body 20 is bored centrally to provide a cylindrical bearing surface 22 within which a jaw actuating plunger 23 is supported for reciprocation axially of the chuck. Plunger 23 effects simultaneous gripping action of the jaws upon a work piece through bell cranks or operating levers 24 which are mounted on pivot shafts 24a and connect the plunger 23 to the three master jaws 25, respectively. These latter are retained in radial guideways 26 by conventional rabbeted construction, as appears more clearly in Figs. 3 and 4. The plunger 23 is caused to reciprocate axially by a conventional draw bar (not shown) to which the adjusting screw 27 of the plunger is secured. Access to screw 27 for adjustment purposes is permitted through the front face of the chuck to set simultaneously the range of operation of all of the master jaws 25. Adjusting screw 27 is retained within the counterbore 28 in the body of the plunger 23 by a retaining collar 29 threadedly engaged in the plunger and locked therein by a set screw 30. The latter also serves to retain a pin 31 which holds spring 32 in compression against detent ball 32a so that the latter is constantly pressed against the lateral surface of the head of adjusting screw 27. Pockets 33 are provided around the periphery of the head of screw 27 within which the detent ball seats to retain the adjustment screw in any one of the various positions to which it may be adjusted. For such adjustment, the tie plate 34 covering the central portion of the face of the chuck is provided with an aperture 35 through which a hex wrench may be inserted to engage the socket in the head of adjusting screw 27. As shown in Figs. 1 and 2 of the drawings, aperture 35 of tie plate 34 is closed by a dust plug 36 which may be removed when adjustment of screw 27 is necessary or when it is desired to use a conventional work center (not shown) in the chuck. Tie plate 34 is secured to chuck body 20 by means of cap screws 37, and is notched to provide recesses 38 to accommodate the inner ends of the master jaws 25.

Figures 5, 6, 7:
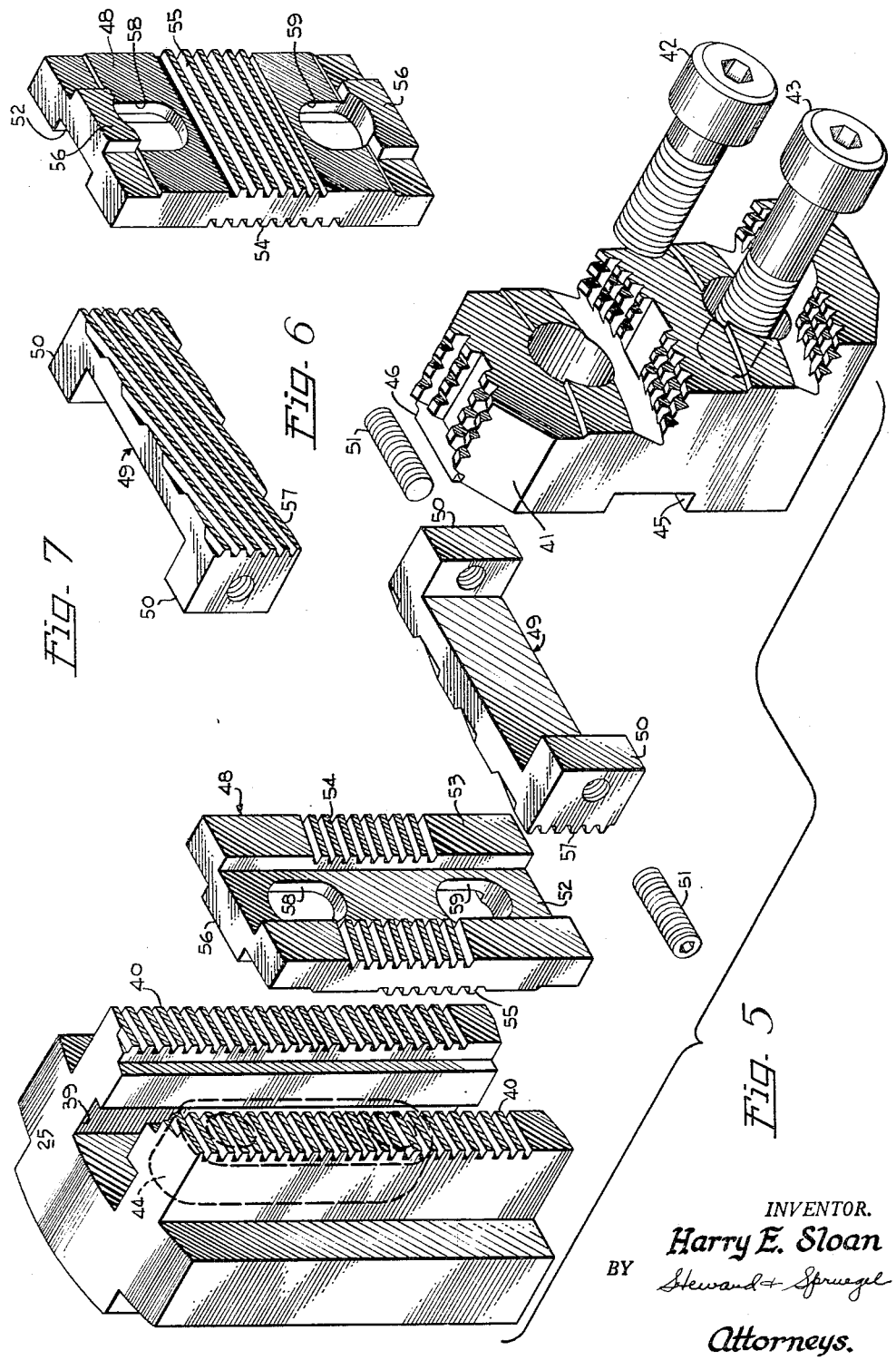
Fig. 5 is an exploded view of one jaw assembly, including a master and top jaw and the adapter-set components disposed in their respective positions relative to the jaws.
Fig. 6 is a perspective view of the adapter plate alone, as viewed from the opposite side in Fig. 5.
Fig. 7 is a perspective view of the adapter key viewed from the opposite side shown in Fig. 5.

As shown more particularly in Figs. 1 and 5, master jaws 25 are each provided with longitudinal guide means comprising a T-slot 39, the central leg of which extends to and opens upon the outer face of the jaw. On either side of this opening, the jaw is provided with a row of serrations or teeth forming a rack 40. These teeth or serrations extend at right angles to the long axis of the guide slot, that is perpendicular to the radius of the chuck, which construction is of course typical of serrated type chuck jaws of standard manufacture today. A conventional top or false jaw, such as jaw 41 in the present illustration, is normally adapted to be secured directly on the serrated face of the master jaw by means of a serrated master jaw locking key (not shown) and tie-bolts, such as bolts 42 and 43. Tie-bolts 42 and 43 pass through the top jaw 41 on either side of the key into engagement with a nut plate 44 confined for longitudinal sliding movement in the head of T-slot 39. In the standard serrated type chucks now in common use, the master jaw locking key has serrations which are adapted to engage with the serrations of rack 40, and the top jaw is provided with a transversely extending keyway 45 and a longitudinally extending spline 46 which fits into the opening of T-slot 39. Since the conventional master jaw key is retained within the keyway 45 of the top jaw 41, the latter is locked in position on the master jaw when the tie-bolts 42, 43, are tightened down. By loosening the tie-bolts the top jaw 41 may be lifted sufficiently to disengage the master jaw key from the teeth of rack 40 and the top jaw may then be slid radially of the chuck to position it in coarse, step-by-step increments with respect to the master jaw.

The foregoing is, as mentioned above, all conventional of existing chucks. By means of the adapter-unit now to be described in detail, precise radial adjustment of the top jaw is obtained intermediate the conventional coarse, step-by-step adjustment.

Figure 3:
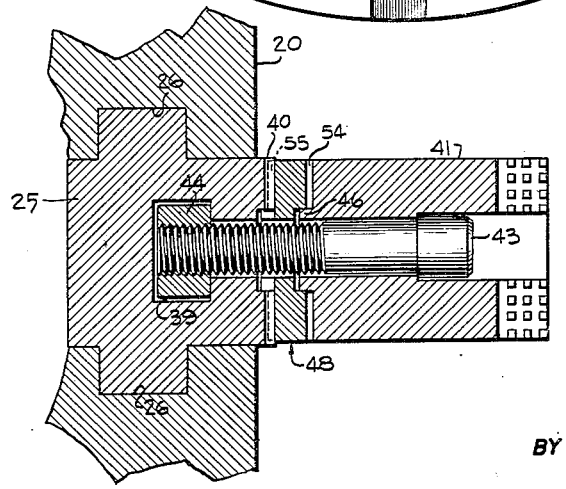
Fig. 3 is a fragmentary view in cross section taken on line 3—3 of Fig. 2.

The adapter-unit or adapter-set, as it is here called, comprises an adapter plate 48 and a transversely extending adjusting key 49 having outwardly directed ends forming legs 50 within which set screws 51 are threadedly engaged. Referring more particularly to Figs. 5 and 6, it will be seen that the adapter plate 48 is of drop-center construction, in effect, providing on its outer surface a longitudinal channel 52 within which the spline 46 of top jaw 41 is adapted to fit. On either side of this channel there is cut into the shoulder portion 53 thereof, teeth or serrations 54 disposed obliquely to the longitudinal axis of the plate member. The opposite side of plate 48, as seen in Fig. 6, is likewise provided with teeth or serrations 55, but in this instance these are disposed at right angles to the long axis of the plate. Teeth 55 are complementary to and engageable with the teeth in rack 40 of the master jaw when the adapter plate is positioned thereon as shown in Figs. 2, 3 and 4 more especially. In order to maintain positive alignment of the longitudinal axis of adapter plate 48 with the corresponding axis of the master jaw 25, plate 48 is provided with tongues or lugs 56 at its opposite ends which form a guide or spline fitting into the opening of T-slot 39 in the outer face of master jaw 25.

The adjusting key 49 is provided on its under surface (see Fig. 7) with teeth or serrations 57 which are complementary to and engageable with the obliquely inclined teeth 54 of adapter plate 48. Top jaw 41 straddles key 49, the standard depth keyway 45 of the jaw being sufficient to receive the key 49 therein and to permit the under surfaces of the jaw to abut upon the outer surfaces of shoulders 53 of adapter plate 48. Spline 46 of the top jaw thus engages channel 52 of the plate and accurate longitudinal alignment of the top jaw with respect to the guide slot 39 of the master jaw is maintained. As before, tie-bolts 42, 43, straddle key 49 and in this case pass through elongated apertures 58, 59, respectively, of plate 48 into engagement with the master jaw nut plate 44. Key 49 is of sufficient length to permit it to be shifted transversely within keyway 45 to accomplish the desired movement of the top jaw longitudinally of the guide slot. Such longitudinal movement of the top jaw is of course effected by the mutual engagement and camming action afforded by the obliquely inclined teeth 54 and 57 of the plate 48 and key 49, respectively, as the key is moved transversely. This latter movement is obtained by means of the set screws 51 which, as mentioned above, are threaded through legs 50 of the key. One or the other of these screws is turned in to engage its inner end against a lateral face of the top jaw 41, after which further turning will cause transverse displacement of the key and corresponding radial adjustment of the top jaw 41. It is to be noted that this manner of providing adjustment means for the key which is entirely external of the keyway in the top jaw, is one of the reasons why the standard keyway normally provided in such top jaws is deep enough to accommodate the adapter-set herein disclosed. Due to this adjusting arrangement, an adjusting key of no greater thickness at points intermediate these jaws than a conventional, fixed key can be provided, and thus render unnecessary any deepening of the standard keyway in existing top jaws. The hereinbefore described adapter plate 48 can be considered as providing a false face for the rack 40 of the conventional serrated master jaw 25, whereby the horizontal serrations of existing chucks can be easily converted to obliquely inclined surfaces such as is disclosed in the patent to Schuster who, however, provides the oblique serrations directly in the face of the master jaw. It will be understood of course that the oblique surfaces on the outer side of the adapter plate 48 could, if desired, be a single spline along which the key 49 may slide transversely within the keyway 45 of the top jaw in order to provide radial movement of the top jaw as hereinabove described. In this case, however, the key 49 would of course be provided with a complementary single groove into which the spline would fit, instead of the oblique teeth specifically shown in the drawings.

It will also be noted that in the particular embodiment of the invention here disclosed, the provision of the adapter plate, which in reality spaces the top jaw slightly away from the master jaw, is another and important reason why existing standard top jaws for conventional serrated type chucks may be used without requiring any change whatsoever. In order to ensure a rigid jaw assembly, the adapter plate 48 as shown preferably covers substantially all of the inner face of the top jaw 41, as well as a major portion of the outer face of the master jaw 25. Consequently, when the jaws are assembled, the outer surfaces of shoulders 53 of the adapter plate intimately engage with substantially the entire length of the top jaw 41 on either side of the spline 46. Similarly, the corresponding inner surfaces of the adapter plate engage a substantial portion of the length of the racks 40 on the master jaw 25. This provides a solid foundation against which the top jaw is secured by means of the tie-bolts 42 and 43. As hereinbefore suggested, the lugs 56 and channel 52 of the adapter plate help further in providing a rigid jaw assembly capable of handling any work required of chucks of this type.

In operation of the device when incorporated into a standard chuck, a rough setting of the top jaw is first made by loosening tie-bolts 42, 43, sufficiently to permit disengagement of the teeth 55 of adapter plate 48 from the rack 40, so that the top jaw and the adapter-set components may be moved longitudinally of the master jaw, i. e. radially of the chuck. When this rough setting is obtained, the tie-bolts are tightened slightly but not completely, and thereafter the fine, precise, radial setting of the top jaw is accomplished by adjusting screws 51 of the key 49. In doing this one of the set screws 51 is backed off and the opposite screw is turned in to cause engagement of its inner end against the side of the top jaw as described above. When the final desired adjustment of the top jaw radially of the chuck center is obtained, tie-bolts 42, 43, are tightened down securely to lock the jaw components firmly together and both set screws 51 are then set snugly against the opposite sides of the top jaw to prevent any movement of the key. The same operation is of course performed on each of the other jaws of the chuck so that when final adjustments have been completed for all of these jaws, the movement of the work engaging jaws may thereafter be controlled through the simultaneous actuation of the master jaws 25 by the plunger 23 and its associated draw bar in conventional manner.

It will be seen from the foregoing that it is thus possible by means of the adapter unit here disclosed to greatly extend the utility of a standard chuck without impairing in any way its usefulness for the originally intended purpose, and without making any change whatever in any of the standard components.

While the foregoing description has been directed to a specific form of the invention which has proved practical in actual experience, it will be understood that many modifications may be made without departing from the spirit of the invention. It may be mentioned, for example, that the legs 50 of key 49 can extend in the opposite direction from that shown in the present drawings, whereby the set screws 51 bear against a lateral surface of the jaw assembly such as the adapter plate 48 itself or the master jaw 25.

All such modifications as fall within the scope or equivalency range of the appended claims are accordingly intended to be included.

What is claimed is:

1. In a chuck, a jaw assembly comprising in combination a master jaw having longitudinal guide means disposed radially of the chuck, a top jaw reciprocable longitudinal of said guide means, a first of said jaws being provided with a keyway and the other with serrations disposed at right angles to said guide means, an adapter plate disposed between said top and master jaws and having serrations on one side complementary to and engageable with the serrations of said other jaw and provided on its opposite side with a surface obliquely inclined with respect to said serrations, a key disposed in said keyway of said first jaw and having a surface complementary to and slidably engaged with the oblique surface of said adapter plate, and means disposed adjacent the ends of said key entirely externally of said keyway and adjustably engaged with a lateral surface of the jaw assembly for moving said key transversely with respect to said guide means in order to provide precise adjustment of the top jaw with respect to the master jaw radially of the chuck.

2. The combination defined in claim 1 wherein said means for moving the key transversely comprises set screws threadedly engaging said key adjacent its ends and adapted and arranged for engagement with opposite sides of one of said jaws.

3. In a chuck, a jaw assembly comprising in combination a master jaw having a longitudinal guide slot disposed radially of the chuck, a top jaw reciprocable longitudinally of said slot, said top jaw being provided with a keyway and said master jaw with serrations disposed at right angles to said slot, an adapter plate having serrations on one side complementary to and engageable with the serrations on said master jaw and provided on the opposite side with a plurality of teeth obliquely inclined with respect to said serrations, a key disposed in said keyway of said top jaw and having a plurality of teeth complementary to and slidably engaged with the inclined teeth of said adapter plate, and screw means disposed adjacent the ends of said key entirely externally of said keyway and engaged with a lateral surface of the jaw assembly for moving said key laterally with respect to said jaws in order to provide precise adjustment of the top jaw longitudinally of the guide slot of said master jaw.

4. The combination defined in claim 3 wherein said screw means comprises set screws provided adjacent the ends of said key for engagement with opposite surfaces of said jaw assembly.

5. The combination defined in claim 3 wherein said adapter plate is provided on said one side with a tongue adapted to fit in said guide slot to prevent lateral movement between said adapter plate and said master jaw, the opposite side of said adapter plate being provided with a groove parallel to said guide slot, said top jaw having a spline fitted to said groove for limiting relative movement of said top jaw with respect to said adapter to reciprocation along said groove.

6. A chuck jaw adapter-set for providing minute radial adjustment between a master jaw and its complementary top jaw in a serrated type chuck, the master jaw having a guide slot disposed radially of the chuck and teeth disposed at right angles to said slot and the top jaw being provided with a keyway parallel to the teeth on the master jaw, said jaws and adapter-set comprising a jaw assembly; said adapter-set comprising a plate member having teeth on one side complementary to the teeth on the master jaw and adapted to be engaged therewith, said plate member being provided on its opposite side with a surface obliquely inclined with respect to the teeth on its other side, a key adapted to be disposed in said keyway of the top jaw, said key having a surface complementary to and adapted to be slidably engaged with the oblique surface of said plate member, and means for moving the key in its keyway transversely with respect to the top jaw, comprising set screws provided adjacent the ends of said key, which when turned into engagement with opposite lateral surfaces of the jaw assembly produce precise radial adjustment of the top jaw on the chuck.

7. An adapter-set as defined in claim 6 wherein said plate member is provided on said one side with a tongue adapted to fit in the guide slot of the master jaw and on its opposite side with a groove adapted to receive a spline on the top jaw, said tongue and groove in said plate member limiting relative movement between said jaws to radial movement along the guide slot of the master jaw.

8. An adapter-set as defined in claim 6, wherein the oblique surfaces on said plate member and on said key comprise a plurality of inclined teeth.

9. A chuck jaw adapter-set for an American Standard serrated type chuck having a master jaw provided with a rack on its outer face and a guide slot along said rack, and a standard top jaw having a longitudinal spline on its under surface, said adapter-set together with said master and top jaws comprising a jaw assembly permitting precise radial adjustment of the top jaw intermediate the step-by-step positions afforded such top jaw by the rack of the master jaw; said adapter-set comprising an adapter plate arranged to be disposed between the top and master jaws of the chuck, said plate having a drop-center extending longitudinally thereof to provide on a first side a guide tongue engageable with the guide slot of the master jaw of the chuck and on its opposite side a guide slot within which the spline of the top jaw is engageable; said plate having on said first side serrations complementary to and engageable with the serrations of the master jaw, and having on said opposite side a surface obliquely inclined with respect to said serrations; a key engageable in the keyway of the top jaw and interposed between said adapter plate and the top jaw, said key having a surface complementary to and slidably engageable with said obliquely inclined surface on said adapter plate; and means entirely external to said keyway for adjustably moving said key transversely of said adapter plate in sliding contact with said obliquely inclined surface of said plate whereby precise movement of the top jaw radially of the chuck may be effected.

10. A chuck jaw adapter-set as defined in claim 9, wherein said key is provided at its ends with legs which project transversely of the plane of said adapter plate, each of said legs having an adjusting screw threadedly engaged therein and extending into contact with a lateral surface of said jaw assembly to effect said transverse movement of said key.

References Cited in the file of this patent
UNITED STATES PATENTS

| | | |
|---|---|---|
| 2,401,971 | Schuster | June 11, 1946 |
| 2,667,358 | Highberg | Jan. 26, 1954 |
| 2,687,308 | Highberg et al. | Aug. 24, 1954 |